Aug. 11, 1942.  A. E. LILLQUIST  2,292,704
ELECTROMAGNETIC BRAKE
Filed Dec. 15, 1941
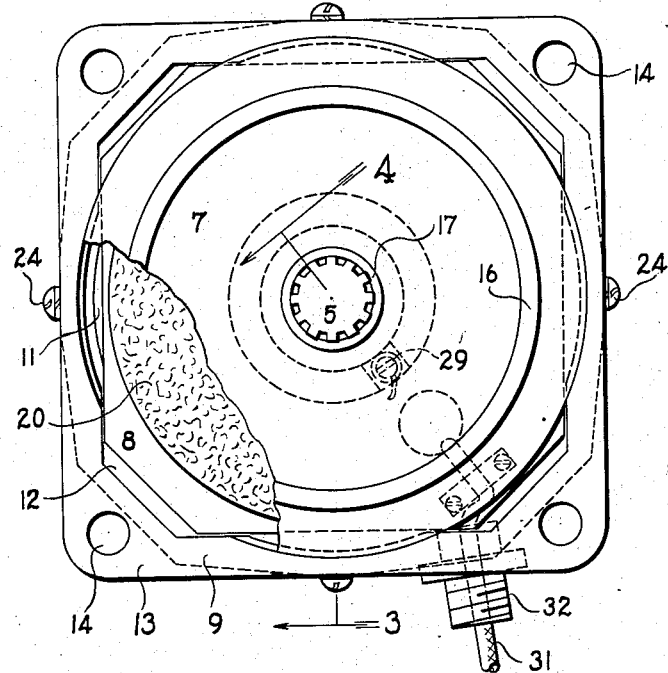
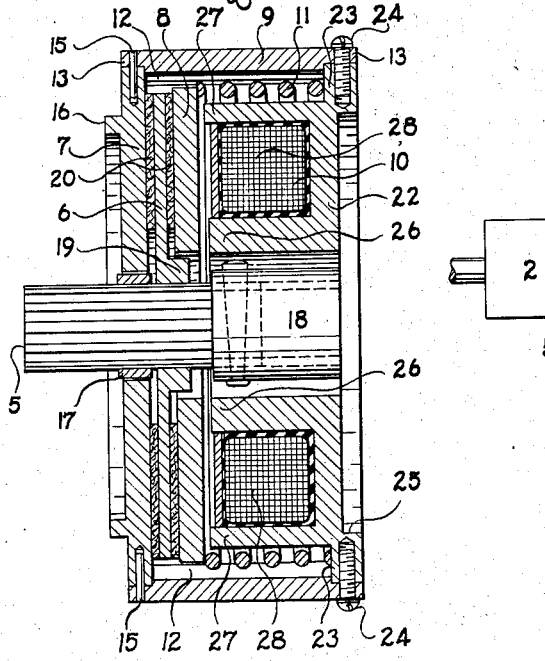
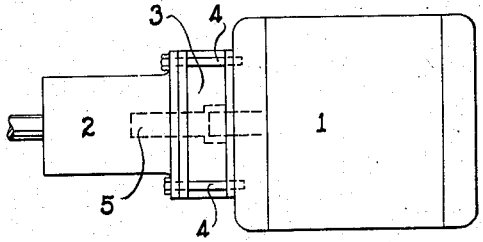
Inventor
Arvid E. Lillquist
By Frank H. Hubbard
Attorney Patented Aug. 11, 1942

2,292,704

UNITED STATES PATENT OFFICE 2,292,704

ELECTROMAGNETIC BRAKE

Arvid E. Lillquist, Milwaukee, Wis., assignor to Cutler-Hammer, Inc., Milwaukee, Wis., a corporation of Delaware Application December 15, 1941, Serial No. 423,009

9 Claims. (Cl. 188—171)

This invention relates to electromagnetic brakes, and more particularly to disk brakes for use in connection with motor drives of various types.

The invention has among its objects to provide an improved electromagnetic disk type brake which is simple, rugged and compact in construction and of large braking capacity in proportion to its weight and diameter.

Another object is to provide a brake of the aforesaid type comprising a relatively small number of parts which are capable of being manufactured and assembled at exceedingly low cost.

Another object is to provide a brake of the aforesaid character which is adapted for use in connection with fractional horsepower drives of various types and particularly in motor drives such as are employed in airplanes for operating the wing flaps thereof.

Various other objects and advantages of the invention will hereinafter appear.

The accompanying drawing illustrates an embodiment which will now be described, it being understood that various modifications may be made in the embodiment illustrated without departing from the spirit and scope of the appended claims.

In the drawing,

Figure 1 is an assembly view of a motor drive having a brake embodying the invention associated therewith;

Fig. 2 is a front elevational view of the brake shown in Fig. 1 with a portion thereof broken away;

Fig. 3 is a vertical sectional view on line 3—3 of Fig. 2, and

Fig. 4 is a fragmentary sectional view on line 4—4 of Fig. 2.

Referring to Fig. 1, the same illustrates a motor drive of a type commonly employed in large airplanes for operating the wing flaps thereof, such drive including a motor 1 which is coupled to an enclosed clutch and speed reducing unit 2 to drive therethrough. A brake 3 embodying the invention is interposed between motor 1 and unit 2, and as shown said brake is clamped in assembled position therebetween by bolts 4 which pass through openings in an end flange on the casing of unit 2 into tapped openings in the housing of motor 1.

As shown in Fig. 3, brake 3 is provided with a drive shaft 5 which carries a circular friction disk 6. Disk 6 is located between a stationary friction plate 7 and a non-rotatable axially movable armature member 8, and said parts are mounted within a housing 9 which also contains brake releasing magnet 10 and a brake setting spring 11 of coil form.

More specifically, housing 9 comprises an aluminum alloy casting having a broached octagonal end to end opening 12 therein. Said housing is also provided with outwardly extending square end flanges 13—13 having drilled corner openings 14 therein for receiving the bolts 4 shown in Fig. 1. The left hand end of housing 9 is counterbored to receive friction plate 7 which is circular in form, and said plate is fixed within said housing by pins 15. Plate 7 has a concentrically disposed annular projection 16 formed on the outer face thereof which is designed to fit within an opening in the casing of unit 2 and the same is also provided with a center opening for receiving shaft 5.

Shaft 5 is splined as shown in Fig. 2 and has a ring member 17 fixed thereto which is journaled within the center opening in friction plate 7. The left hand end of shaft 5 extends beyond plate 7 for engagement with a driving part associated with unit 2 and the right hand end of said shaft has an internally splined bushing 18 fixed thereto for operatively connecting the same to the shaft of motor 1. Friction disk 6 is mounted upon shaft 5 to rotate therewith and to slide axially thereon, and in the embodiment illustrated the same is provided with a center hub projection 19 for receiving said shaft and has a pair of friction linings 20—20 secured to opposite sides thereof.

Armature 8 is slidably supported within the opening 12 in housing 9, and as shown in Fig. 2 the same is octagonal in shape and fits within said opening to prevent rotation thereof. The operating magnet 10 associated with armature 8 includes a cylindrical field member 22 having an outwardly extending circular flange 23 formed on the right hand end thereof. The right hand end of housing 9 is counterbored to receive flange 23 and said field member is held in assembled position within said housing by screws 24 which extend through openings in said housing into tapped openings in said flange. Field member 22 is counterbored as shown at 25 to receive a circular projection on the housing of motor 1 and the same is provided with a center opening for receiving the coupling 18. The inner face of field member 22 is recessed to provide concentrically disposed inner and outer pole projections 26 and 27 and an operating winding 28 of annular form is mounted in the space between said pole projections. As shown in Fig. 4, one of the terminals of winding 28 is grounded to the inner pole projection 26 by a screw 29 and the other terminal thereof is connected to an insulated lead 31 which passes through a conduit fitting 32 secured within a tapped opening in the underside of housing 9.

The outer pole projection 27 on field member 22 is of such diameter as to provide a space between the same and the inner surface of housing 9 and the brake setting spring 11 is located within said space and surrounds said outer pole projection. Spring 11 is held under compression between armature 8 and the flange 23 on field member 22, and as is apparent when operating winding 28 is deenergized said spring acts to clamp friction disk 6 between said armature and the stationary friction plate 7 for setting of the brake. Upon energization of winding 28 armature 8 is moved out of engagement with disk 7 against the action of spring 11 for release of the brake.

In connection with the foregoing it should be noted that the above described brake mechanism has numerous advantages. For example, the operating magnet 10 and brake setting spring 11 are of relatively large size to provide for large braking capacity in proportion to the weight and overall dimensions of the brake. Also it should be noted that support of the armature and its associated magnet directly within the housing results in an exceedingly simple, rugged and compact brake structure.

What I claim as new and desire to secure by Letters Patent is:

1. An electromagnetic brake comprising a rotatable drive shaft, a friction disk mounted upon said shaft to rotate therewith and to move axially thereon, a stationary housing, surrounding said disk and having a stationary braking part associated with one end thereof for frictionally engaging one of the faces of said disk, an armature member for frictionally engaging the opposite face of said disk, said armature member being slidable within said housing and being held against rotation thereby, a brake setting spring located within said housing for biasing said armature member in a direction to clamp said friction disk between said armature member and said stationary braking part and a brake releasing magnet associated with said armature member and mounting within said housing, said brake setting spring being of coil form and surrounding said magnet.

2. An electromagnetic brake comprising a rotatable drive shaft, a friction disk mounted upon said shaft to rotate therewith and to move axially thereon, a stationary housing surrounding said friction disk and having an end to end opening therein, a stationary friction plate fixed to one end of said housing for frictionally engaging one of the faces of said disk, an armature member for frictionally engaging the opposite face of said disk, said armature member being slidably mounted within said housing and being held against rotation thereby, a brake setting spring of coil form located within said housing and acting to bias said armature member in a direction to clamp said disk between said armature member and said stationary friction plate, and a brake releasing magnet mounted within said housing and associated with said armature member, said magnet being surrounded by said spring and being secured to said housing on the end opposite said stationary friction plate.

3. An electromagnetic brake comprising a rotatable drive shaft, a friction disk mounted upon said shaft to rotate therewith and to move axially thereon, a stationary housing surrounding said friction disk and having an end to end opening therein, a circular operating magnet located within said housing and secured to one end thereof, a stationary friction plate mounted upon the opposite end of said housing for engaging said friction disk on one side thereof, an armature member associated with said magnet for engaging said friction disk on the opposite side thereof, said armature member being slidable within said housing and being held against rotation thereby, and a brake setting spring of coil form surrounding said operating magnet and acting to bias said armature member in a direction to clamp said friction disk between said armature member and said stationary friction plate.

4. An electromagnetic brake comprising a rotatable drive shaft, a friction disk mounted upon said shaft to rotate therewith and to move axially thereon, a stationary housing surrounding said friction disk and having an end to end opening therein, a circular operaing magnet located within said housing and secured to one end thereof, a stationary friction plate mounted upon the opposite end of said housing for engaging said friction disk on one side thereof, said drive shaft being journaled within a center opening in said friction plate, an armature member associated with said magnet for engaging said friction disk on the side opposite said friction plate, said armature member being slidable within said housing and being held against rotation thereby, and a brake setting spring of coil form surrounding said operating magnet and acting to bias said armature member in a direction to clamp said friction disk between said armature member and said stationary friction plate.

5. An electromagnetic brake comprising a rotatable drive shaft, a friction disk mounted upon said shaft to rotate therewith and to move axially thereon, a stationary housing surrounding said friction disk and having an end to end opening therein, a stationary friction member mounted upon one end of said housing for engaging said disk on one side thereof, an armature member for frictionally engaging the opposite side of said disk, said armature member being slidable within said housing and said housing and said armature member having engaging faces of non-circular contour to hold said armature member against rotation, a brake setting spring located within said housing for biasing said armature member in a direction to clamp said friction disk between said armature member and said stationary friction plate and a brake releasing magnet associated with said armature member and mounted within said housing, said brake setting spring being of coil form and surrounding said operating magnet.

6. An electromagnetic brake comprising a rotatable drive shaft, a friction disk mounted upon said shaft to rotate therewith and to move axially thereon, a stationary housing surrounding said friction disk and having an end to end opening therein, a circular operating magnet fixed to one end of said housing and including a field member having concentric inner and outer pole projections which extend into said housing, said field member having a center opening therein for receiving said shaft and said outer pole projection being spaced radially with respect to said housing, a stationary friction plate secured to said housing on the end opposite said magnet for engaging said friction disk on one side thereof, an armature member associated with said magnet for engaging said friction disk on the side opposite said friction plate, said armature member being slidable within said housing and being held against rotation thereby, and a brake setting spring of coil form surounding said outer pole projection and acting to bias said armature member in a direction to clamp said friction disk between said armature member and said stationary friction plate.

7. An electromagnetic brake comprising a rotatable drive shaft, a friction disk mounted upon said shaft to rotate therewith and to move axially thereon, a stationary housing surrounding said friction disk and having an end to end opening therein, a stationary friction member mounted upon one end of said housing for engaging said disk on one side thereof, an armature member for frictionally engaging the opposite side of said disk, said armature member being slidable within said housing and said housing and said armature member having engaging faces of non-circular contour to hold said armature member against rotation, a circular operating magnet associated with said armature member and fixed to said housing on the end opposite said friction member, said operating magnet including a field member having concentric outer and inner pole projections which extend into said housing, said outer pole projection being spaced radially with respect to said housing, and a brake setting spring of coil form for biasing said armature member in a direction to clamp said friction disk between said armature member and said stationary friction plate, said brake setting spring surrounding said outer pole projection and being held under compression between said armature member and said field member.

8. An electromagnetic brake comprising a rotatable drive shaft, a friction disk mounted upon said shaft to rotate therewith and to move axially thereon, a stationary housing surrounding said disk and having a stationary braking part associated therewith located to one side of said disk, an armature member located on the opposite side of said disk, said armature member being slidable within said housing and being held against rotation thereby, a brake setting spring within said housing for biasing said armature member in a direction to hold said friction disk in frictional engagement with said stationary braking part, and a brake releasing magnet associated with said armature member and mounted within said housing, said brake setting spring being of coil form and surrounding said magnet.

9. An electromagnetic brake comprising a rotatable drive shaft, a friction disk mounted upon said shaft to rotate therewith and to move axially thereon, a stationary housing surrounding said disk and having a stationary braking part associated therewith located to one side of said disk, an armature member located on the opposite side of said disk, said armature member being slidable within said housing and said housing and said armature member having engaging faces of non-circular contour to hold said armature member against rotation, a brake setting spring of coil form located within said housing for biasing said armature member in a direction to hold said friction disk in frictional engagement with said stationary braking part, a brake releasing magnet associated with said armature member and fixed within said housing, said brake setting spring surrounding said operating magnet and being held under compression between said operating magnet and said armature member.

ARVID E. LILLQUIST.